United States Patent [19]

Beffa et al.

[11] 4,033,942
[45] July 5, 1977

[54] CHROMIUM COMPLEX DYE, INCLUDING AZO AND AZO METHINE DYE COMPOUNDS

[75] Inventors: Fabio Beffa, Riehen, Switzerland; Gerhard Back, Lorrach, Germany; Eginhard Steiner, Fullinsdorf, Switzerland

[73] Assignee: Ciba-Geigy AG, Basel, Switzerland

[22] Filed: Apr. 27, 1976

[21] Appl. No.: 680,640

[30] Foreign Application Priority Data

May 14, 1975 Switzerland ............ 6193/75

[52] U.S. Cl. .............. 260/145 A; 260/145 B; 260/151
[51] Int. Cl.² .............. C09B 45/26; C09B 45/06
[58] Field of Search ........... 260/145 A, 145 B, 150, 260/151

[56] References Cited

UNITED STATES PATENTS

| | | | |
|---|---|---|---|
| 2,985,646 | 5/1961 | Schetty et al. | 260/145 A |
| 3,314,932 | 4/1967 | Scholl et al. | 260/145 B |
| 3,391,132 | 7/1968 | Beffa et al. | 260/151 X |
| 3,406,162 | 10/1968 | Neier | 260/150 X |
| 3,661,898 | 5/1972 | Dehnert et al. | 260/145 B X |
| 3,939,140 | 2/1976 | Meinniger et al. | 260/145 A |

FOREIGN PATENTS OR APPLICATIONS 2,520,526 11/1975 Germany ............ 260/145 A Primary Examiner—Allen B. Curtis Attorney, Agent, or Firm—Karl F. Jorda; Edward McC. Roberts; Michael W. Glynn

[57] ABSTRACT

1:2 Chromium complex dyes of an azo compound of the formula

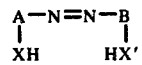

and an azomethine compound of the formula

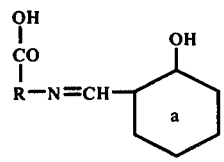

complexed to a chromium atom, wherein A is an ortho-phenylene or — naphthylene diazo component radical; B is an ortho-phenylene or — naphthylene coupling component radical; X is —O— or —CO—O—; X' is —O—, —NH—, —N(lower alkyl)—, —N(aralkyl)— or —N(aryl)—; R is an aliphatic radical; the benzene ring "a" is unsubstituted or substituted by a fused benzene ring, halo, nitro alkyl or alkoxy; the molecule containing 0–5 water solubilizing groups and optionally a group of the formula —N=N—Ar—N=N—Ar' and/or –N=N—Ar'' wherein Ar, Ar' and Ar'' represent an aromatic or carbocyclic radical.

21 Claims, No Drawings

CHROMIUM COMPLEX DYE, INCLUDING AZO AND AZO METHINE DYE COMPOUNDS

The present invention provides 1:2 chromium complex dyes which contain one molecule of an azo or azomethine compound of the formula

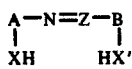  (1)

and one molecule of the azomethine compound of the formula

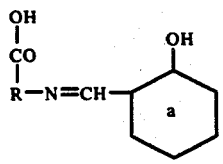  (2)

complexed to a chromium atom, in which formulae
  A represents the radical of a diazo component of the benzene or naphthalene series, which carries the complex-forming group XH in ortho-position to the azo group,
  B represents the radical of a coupling component which couples in ortho-position to HX' or the radical of an aromatic o-hydroxyaldehyde,
  Z represents a nitrogen atom or the —CH group,
  X represents an oxygen atom or a —CO—O group,
  X' represents an oxygen atom, a NH group, a low molecular N-alkyl, N-aralkyl or N-aryl group, and
  R represents a substituted or unsubstituted aliphatic or cycloaliphatic radical,
and the benzene ring a can carry a further fused benzene ring or can be substituted by halogen, nitro, alkyl and alkoxy, in particular by low molecular alkyl and alkoxy, and these compounds contain together 0 to 5 water-solubilising groups and, optionally, a group of the formula

  (3)

and/or one to two groups of the formula

  (4)

wherein Ar, Ar' and Ar" represent an aromatic, carbocyclic or heterocyclic radical.

The term "low molecular" denotes that the radicals so qualified contain from 1 to 4 carbon atoms.

In particular, the invention provides 1:2 chromium complexes which contain one compound of the formula

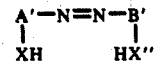  (5)

and one compound of the formula

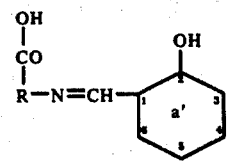  (6)

complexed to each chromium atom, in which formulae
  A' represents a radical of the benzene or naphthalene series,
  B' represents a radical of the benzene, naphthalene or pyrazole series, the radical of a pyridone or of a acetoacetic or benzoylacetic anilide, and
  X" represents an oxygen atom or the —NH group,
and wherein the ring a' carries in 3-position, or preferably in 5-position, a group of the formula (3) or (4) or is unsubstituted, and the other symbols are as defined in formulae (1) and (2), and these compounds carry together 0 to 5 sulpho groups.

The dyes of the present invention are obtained by converting a dye of the formula (1) or an azomethine compound of the formula (2) with a chromium donor into the 1:1 chromium complex, and then reacting this latter with the non-metallised compound of the formula (2) or (1) to give the 1:2 chromium complex.

Preferably the 1:1 chromium complex of an azo dye of the formula (5) is obtained initially and then reacted with the azomethine compound of the formula (6).

It is advantageous to prepare the azomethine compounds of the formulae (2) or (6) in the chroming mixture in situ from the corresponding educts, i.e. from amino acids of the formula

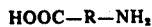

and aldehydes of the formulae

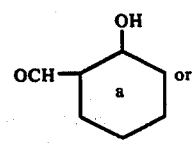  (8)

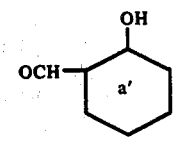  (8a)

Instead of carrying the complexing grups XH and HX", the dyes of the formula (5) in particular can carry substituents which can be converted into metallisable groups, for example low molecular alkony groups, in particular methoxy groups, provided a metallisable group, for example a hydroxy group, is formed therefrom. The preferred complexing groups is the hydroxyl group and HX" is preferably the amino group.

If the dyes of the present invention contain a disazo group or an azo group of the formula (3) or (4), such group is preferably bound in 5-position of the ring a' of the azomethine compound of the formula (6).

Ar, Ar' and Ar" in formulae (3) and (4) preferably represent benzene or naphthalene radicals, and Ar' and Ar" can also represent heterocyclic radicals, for example thiazolyl, benzthiazolyl, thiadiazolyl, benzisothiazolyl, imidazolyl, benzimidazolyl, pyrazolyl, triazolyl, naphthothiazolyl, quinolinyl, pyridinyl, indazolyl, oxazolyl, or benzoxazolyl radicals. The radicals Ar' and Ar" can carry customary substituents of diazo components, but preferably are phenyl or naphthyl radicals which substituted by chlorine, bromine, nitro, sulpho, sulphonamido and N-monosubstituted or N,N-disubstituted sulphonamido groups, sulphone groups, low molecular alkyl or alkoxy groups. Ar is preferably a phenylene or naphthylene radical, the principal possible substituents being low molecular alkyl and alkoxy radicals, for example methyl, ethyl and methoxy.

The azo dyes of the formulae (1) and (5) can be obtained in known manner by coupling. The radical A or A' can be a radical of the benzene or naphthalene series and besides the complexing group can carry the customary substituents, for example chlorine, bromine, cyano, nitro, low molecular alkyl, low molecular alkoxy, aryloxy, above all phenoxy, sulpho, sulphonamido, and N-monosubstituted or N,N-disubstituted sulphonamido groups, sulphone groups and acylamino groups.

The term acylamino denotes herein amino groups which are substituted by acyl radicals of aliphatic or aromatic sulphonic and, in particular, carboxylic acids or of carbonic acid monoalkyl or monoaryl esters. The term "acyl" thus encompasses low molecular alkanoyl, alkoxycarbonyl and alkylsulphonyl groups, such as the acetyl, chloroacetyl, propionyl, butyryl, methoxycarbonyl, ethoxycarbonyl, methylsulphonyl or ethylsulphonyl groups, as well as aroyl, aryloxycarbonyl and arylsulphonyl group, e.g. the benzoyl, chlorobenzyl, methylbenzoyl, nitrobenzoyl, phenoxycarbonyl, phenylsulphonyl or p-methylphenylsulphonyl group. Preferred acylamino groups are low molecular alkanoylamino, alkoxycarbonylamino or unsubstituted or substituted benzoylamino groups.

As monosubstituted or disubstituted sulphonamide groups mention may be made principally of the sulphonamido groups which are substituted by low molecular alkyl, hydroxyalkyl, alkoxyalkyl, cyanoalkyl, aralkyl, cycloalkyl, in particular cyclohexyl, aralkyl, in particular benzyl, or sulphonamido groups which are substituted or by aryl radicals. Suitable sulphone groups are primarily low molecular alkylsulphonyl groups, low molecular alkylsulphonyl groups which are substituted by hydroxyl, chlorine or low molecular alkoxy, chlorophenylsulphonyl, methylphenylsulphonyl, nitrophenylsulphonyl, methoxyphenylsulphonyl or benzylsulphonyl groups.

Examples of suitable diazo components of dyes of the formula (2) are: anthranilic acid, 4-sulpho- and 4-sulphonamidoanthranilic acid, 2-amino-1-hydroxybenzene, 2-amino-1-methoxybenzene, 4-chloro- and 4,6-dichloro-2-amino-1-hydroxybenzene, 4- or 5-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and 5-benzylsulphone, 2-amino-1-hydroxybenzene-4-methyl-, -ethyl-, -chloromethyl- and -butylsulphone, 5-nitro- and 6-nitro-2-amino-1-hydroxybenzene-4-methylsulphone, 2-amino-1-hydroxybenzene-4- or -5-sulphamide, 2-amino-1-hydroxybenzene-4- or -5-sulph-N-methyl- and -sulph-N-β-hydroxyethylamide, 2-amino-1-methoxybenzene-4-sulphanilide, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or -6-sulphonic acid amide, 4- or 5-chloroanisidine, 4- or 5-nitroanisidine, 2-methoxy-5-methylaniline, 2,5-dimethoxyaniline, 2-amino-1-hydroxybenzene-4- or -5-sulphanthranilide, 2-amino-1-hydroxybenzene-4- or -5-sulphonic acid, 4-nitro-2-amino-1-hydroxybenzene-5- or -6-sulphonic acid, 5-nitro- or 6-nitro-2-amino-1-hydroxybenzene-4-sulphonic acid, 6-chloro-2-amino-1-hydroxybenzene-4-sulphonic acid, anisidine-4- or -5-sulphonic acid, 1-amino-2-hydroxynaphthalene-4-sulphonic acid, 1-amino-2-hydroxynaphthalene-6-nitro-4-sulphonic acid, 4-(4'-sulphophenylzo)-2-amino-1-hydroxybenzene, 4-(3'-sulphanamidophenylazo)-2-amino-1-hydroxybenzene, 4-(4'-phenylazophenylazo)-2-amino-1-hydroxybenzene.

The radical B or B' can be derived in particular from the following groups of coupling components: naphthols which are unsubstituted or substituted by chlorine, acylamino, amino, sulphonamido, N-monosubstituted or N,N-disubstituted sulphonamido groups and sulphone groups, these groups having the same meanings as previously assigned to them; naphthylamines which are unsubstituted or substituted by halogen, in particular bromine, methyl, methoxy, sulpho, sulphonamido, monoor disubstituted sulphonamido or sulphone groups; 5-pyrazolones which preferably have in 1-position a phenyl or naphthyl radical which is unsubstituted or substituted by chlorine, nitro, low molecular alkyl and alkoxy groups, sulphonamido, N-alkylated sulphoanmido groups, sulphone or especially sulpho groups; acetoacetic anilides and benzoylacetic anilides which may be substituted in the anilide nucleus by chlorine, bromine, low molecular alkyl, alkoxy, sulphone, sulphonamido, N-monosubstituted or N,N-disubstituted sulphonamido groups and sulpho groups; phenols which are substituted by low molecular acylamino groups and/or by alkyl groups of 1 to 5 carbon atoms and which couple in the orthoposition; 2,6-dihydroxy-3-cyano- or -carbonamido-4-alkylpiperidine, and 6-hydroxy-2-pyridones which are substituted in 1-position by low molecular, substituted or unsubstituted alkyl, e.g. methyl, isopropyl, β-hydroxyethyl, β-aminoethyl or γ-isopropoxypropyl, and in 3-position carry a cyano or carbonamido group and in 4-position a low molecular alkyl group, especially methyl. Examples of such coupling components are:

2-naphthol,
1,3- or 1,5-dihydroxynaphthalene,
2-naphthol-6-sulphonamide,
2-naphthol-6-β-hydroxyethylsulphone,
1-naphthol,
1-acetylamino-7-naphthol,
1-propionylamino-7-naphthol,
1-carbomethyoxyamino-7-naphthol,
1-carboethoxyamino-7-naphthol,
1-carbopropoxyamino-7-naphthol,
1-dimethylaminosulphonyl-amino-7-naphthol,
6-acetyl-2-naphthol,
2-naphthol-3, -4-, -5-, -6-, -7- or 8-sulphonic acid,
1-naphthol-3-, -4- or 5-sulphonic acid,
4-acetyl-2-naphthol,
4-methoxy-1-naphthol,
4-acetyl-1-naphthol,
1-naphthol-3-, -4- or -5-sulphonamide,
2-naphthol-3-, -4-, -5-, -6-, -7- or -8-sulphonamide,
5,8-dichloro-1-naphthol,
5-chloro-1-naphthol,
2-naphthylamine,
1-naphthylamine-4-sulphonic acid,
2-aminonaphthalene-6-sulphonic acid, 1-naphthylamine-4-sulphonamide,
2-methylaminonaphthalene,
2-aminonaphthalene-6-sulphonamide,
6-methyl-2-aminonaphthalene,
6-bromo-2-aminonaphthalene,
6-methoxy-2-aminonaphthalene,
2-phenylaminonaphthalene,
2-(3'-chlorophenyl)-aminonaphthalene,
2-aminonaphthalene-6-sulphonic acid-N-methylamide or -6-sulphonic acid,
1,3-dimethyl-pyrazol-5-one,
1-phenyl-3-methyl-pyrazol-5-one,
1-phenyl-3-pyrazolone-3-carboxy amide,
1-(2'-, 3'- or 4'-methylphenyl)-3-methyl-pyrazol-5-one,
1-[3'- or 4'-(β-hydroxyethylsulphonyl)-phenyl]-3-methylpyrazol-5-one,
1-(2'-, 3'- or 4'-sulphophenyl)-3-methyl-pyrazol-5-one,
1-(2'-chloro-5'-sulphophenyl)-3-methyl-pyrazol-5-one,
1-(2'- or 4'-methoxyphenyl)-3-methyl-pyrazol-5-one,
1-(2'-, 3'- or 4'-chlorophenyl)-3-methyl-pyrazol-5-one,
1-(2'-, 3'- or 4'-nitrophenyl)-3-methyl-pyrazol-5-one,
1-(2'-, 5' or 3'-, 4''-dichlorophenyl)-3-methyl-pyrazol-5-one,
1-(2'-, 3'- or 4'-sulphamoylphenyl)-3-methyl-pyrazol-5-one,
1-(2',5'-dichloro-4'-sulphophenyl)-3-methyl-pyrazol-5-one,
1-(2'-, 3'- or 4'-methylsulphonylphenyl)-3-methyl-pyrazol-5-one, acetoacetic anilide,
acetoacetic anilide-4-sulphonic acid,
acetoacetic-o-anisidide,
acetoacetic-o-toluidide,
acetoacetic-o-chloroanilide,
acetoacetic anilide-3- or -4-sulphonamide,
acetoacetic-m-xylidide,
tetralol
4-methylphenol,
3-dialkylaminophenol, especially 3-dimethylamino- and 3-diethyl-aminophenol,
4-butylphenol,
4-amylphenol, especially 4-t-amylphenol,
2-isopropyl-4-methylphenol,
2- or 3-acetylamino-4-methylphenol,
2-methyoxycarbonylamino-4-methylphenol,
2-ethoxycarbonylamino-4-methylphenol,
2,4-dimethylphenol and 3,4-dimethylphenol,
2,6-dihydroxy-3-cyano-4-methylpyridine,
1-methyl-3-cyano-4-ethyl-6-hydroxypyridone,
1-amino-3-cyano-4-methyl-6-hydroxypyridone,
1-phenyl-3-carbonamido-4-methyl-6-hydroxypyridone.

In the amino acids of the formula (7) R is preferably a substituted or unsubstituted alkylene radical, an alkenylene or a cycloalkylene radical. Where R is an alkylene radical it contains preferably from 1 to 11 carbon atoms and possible substituents are the hydroxy, amino, methylmercapto, methylsulphonyl or sulpho group, aryl radicals, in particular phenyl or substituted phenyl, for example hydroxyphenyl or phenyl which is substituted by low molecular alkyl or alkoxy, and finally heterocyclic radicals, such as imidazolyl or indolyl. Where R is an alkenylene radical it is, for example, the vinylene radical or the phenylvinylene radical. A suitable cycloalkylene radical is above all the cyclohexylene group.

Suitable amino acids are described, for example, in Greenstein and Winitz, Chemistry of Amino Acids, Wiley (1961). Examples of such amino acids are: glycine, α-alanine, β-alanine, 4-aminobutyric acid, 5-aminovaleric acid, 6-aminocapronic acid, 7-aminoheptanoic acid, 8-aminocaprylic acid, 11-aminoundecanoic acid, 12-aminolauric acid, serine, 5-benzylcystein, phenylglycine, phenylalanine, norleucine, norvaline, leucine, lysine, methionine, methionine sulphone, threonine, histidine, tryptophane, tyrosine, 2-aminocyclohexanecarboxylic acid. Preferred amino acids are α-amino and β-amino acids, since their azomethines are good chelating agents.

Since the azomethine formation takes place partly under saponifying conditions (for example at pH 11), it is also possible to use primary products of amino acids, for example acylated amino acids or, in particular, lactams. Examples of such compounds are: caprolactam, laurinolactam, 2-acetaminoacrylic acid, 2-acetaminocinnamic acid. Examples of suitable aldehydes of the formula (8) and (8a) are:

2-hydroxynaphthaldehyde, 1-hydroxy-2-naphthaldehyde,
2-hydroxybenzoaldehyde,
3- and 5-methyl-2-hydroxybenzaldehyde,
3,5-dimethyl-2-hydroxybenzaldehyde,
5-butyl-2-hydroxybenzaldehyde,
5-chloro- or -bromo-2-hydroxybenzaldehyde,
3-chloro-2-hydroxybenzaldehyde,
3,5-dichloro-2-hydroxybenzaldehyde,
5-sulpho-2-hydroxybenzaldehyde,
3-methyl-5-chloro-2-hydroxybenzaldehyde, as well as above all the corresponding aldehydes which are substituted in 3- or 5-position by an azo or diazo group of the formula (3) or (4). The introduction of an azo or disazo group into the cited o-hydroxyaldehydes is accomplished in the customary way by coupling a compound Ar'—N=N—Ar—N$_2^+$ or Ar''—N$_2^+$ with an aldehyde.

These diazonium compounds are derived preferably from naphthylamines and especially anilines, for example α-naphthylamine, 4,8-disulpho-β-naphthylamine, 6,8-disulpho-β-naphthylamine, 1-naphthylamine-4-, -5-, -6-, -7- or -8-sulphonic acid, m-aminobenzene-sulphamide, aniline, 2-, 3- or 4-sulphoaniline, 4-nitroaniline, toluidine, anisidine, 4-chloroaniline, 4-chloro-3-sulphoaniline, 4-nitro-2-sulphoaniline, 4-methyl-3-sulphoaniline or 2-nitro-4-sulphoaniline.

If the compound of the formula (1) is an azomethine, then the amines of the benzene or naphthalene series from which the azo dyes of the formula (1) are derived are also suitable for obtaining it, and as aldehyde components it is possible to use the aldehydes of the formula (8) or (8a).

Preferred groups of dyes of the present invention are those of the formula

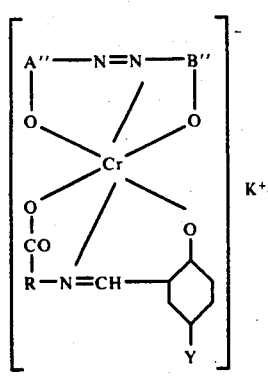

(9)

and

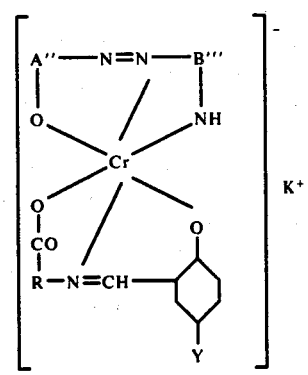

(10)

wherein

A" represents a phenyl or naphthyl radical which is unsubstituted or substituted by sulpho, chlorine, bromine, nitro, cyano, low molecular alkyl and low molecular alkoxy, B" represents a phenyl radical which is unsubstituted or substituted by alkyl and/or acylamino, a naphthyl radical which is unsubstituted or substituted by chlorine, sulpho or acylamino, or represents the radical of a 1-aryl-3-methyl-pyrazol-5-one or the radical of an acetoacetic or benzoylacetic anilide which is unsubstituted or substituted in the anilide nucleus by sulpho, nitro, chlorine, bromine, alkyl and alkoxy, B''' represents a naphthyl or sulphonaphthyl radical, R represents a methylene or ethylene group which is unsubstituted or substituted by alkyl of 1 to 4 carbon atoms, phenyl, hydroxyphenyl or benzyl, $K^+$ represents a cation and Y represents hydrogen or a radical of the formula

(11)

wherein n is 0 or 1, $Ar_1$ represents a phenylene or naphthylene radical which is unsubstituted or substituted by sulpho, alkyl or alkoxy, and $Ar_2$ represents a phenyl or naphthyl radical which is unsubsubstituted or substituted by chlorine, bromine, nitro, sulpho, alkyl or alkoxy.

Preferably R represents methylene, ethylidene or ethylene.

The conversion of the azo or azomethine dyes of the formula (5) or (7) into the 1:1 chromium complex is accomplished by conventional methods which are known per se, for example, by reacting it in an acid medium with a salt of trivalent chromium e.g. chromium formiate, chromium sulphate, chromium chloride hexahydrate or chromium fluoride, at boiling temperature or optionally at temperatures exceeding 100° C. Trivalent chromium can also be produced in the reaction mixture from chromium-(VI) compounds by simultaneously adding a reducing agent, e.g. glucose. In general, it is advisable to carry out the metallising in the presence of aqueous, organic-aqueous or in pure organic solvents, e.g. alcohols or ketones.

The reaction of the 1:1 chromium complex of the dye of the formula (5) or (7) with the metal-free azomethine dye of the formula (6) or (8), or the reaction between a 1:1 chromium complex of a dye of the formula (5) or (7), an amino acid of the formula (9) and an aldehyde of the formula (10) or (10a) is desirably carried out in a neutral to weakly alkaline medium, in an open or a sealed vessel, and at elevated temperature, e.g. at temperatures between 50° and 120° C. The process can be carried out in organic solvents, e.g. alcohols or ketones or in an aqueous solution, in which case the addition of solvents, e.g. alcohols, dimethyl formamide, can promote the reaction if so desired. It is usually advisable to react as far as possible equivalent amounts of the chromium-containing 1:1 complex and the metal-free dye, the molecular ratio between metal-free dye and 1:1 complex being desirably at least 0.85:1 and at most 1:0.85. A surplus of metal-containing dye is usually less disadvantageous than one of metal-free dye. The closer this ratio is to 1:1 the more advantageous the result generally is.

The chromium-containing mixed complexes obtained by the processes described hereinabove are isolated with advantage in the form of their salts, especially their alkali salts, above all sodium salts, or also ammonium salts or salts of organic amines with positively charged nitrogen atom. They are primarily suitable for dyeing natural or synthetic polyamide material. Those dyes which contain no water-solubilising groups are especially suitable for nylon, those containing 1 to 2 water-solubilising groups, in particular sulpho groups, for wool, silk, nylon and leather, and the readily soluble dyes containing 2 to 5 sulpho groups for leather and paper. The dyeing is performed advantageously in the presence of customary levelling agents.

The dyes of this invention are characterised by a brightness of shade which is unusual for 1:2 chromium complexes. They give level dyeings of good fastness to light, washing, water, perspiration, alkali, acid, milling, decatising and rubbing. A particular advantage of the dyes of the present invention is also to be observed in the fact that it is possible to obtain dyes which to some extent are not based on aromatic starting compounds.

The invention is illustrated by the following Examples in which the parts and percentages are by weight, unless otherwise indicated.

Example 1

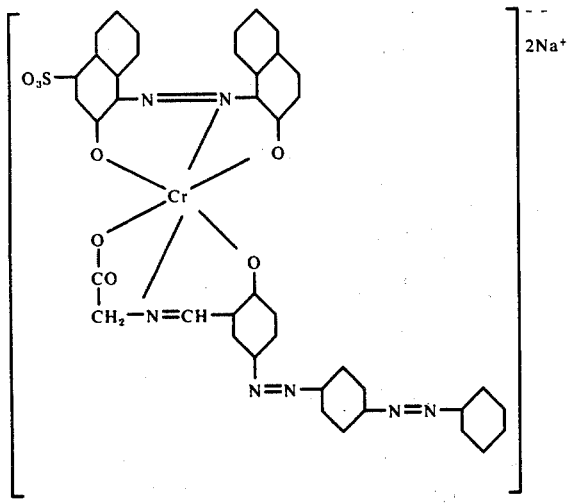

44.4 parts of the 1:1 complex chromium compound corresponding to 5.2 parts of chromium and 39.4 parts of the monoazo dye obtained from diazotised 1-amino-2-hydroxynaphthalene-4-sulphonic acid and 2-hydroxynaphthalene, 33 parts of the coupling product of 4-aminoazobenzene and salicylaldehyde, 7.5 parts of glycine, and 80 parts by volume of 30% sodium carbonate solution, are suspended in 500 parts by volume of ethylene glycol. The mixture is heated to 80°–95° C and kept at this temperature until the starting substances can no longer be detected. The chromium-containing dye is precipitated by adding sodium chloride, collected by filtration, and dried. After it has been dried, the dye is a dark powder which dissolves in water to form a brown solution and dyes leather from a weakly acid bath in brown shades.

Example 2

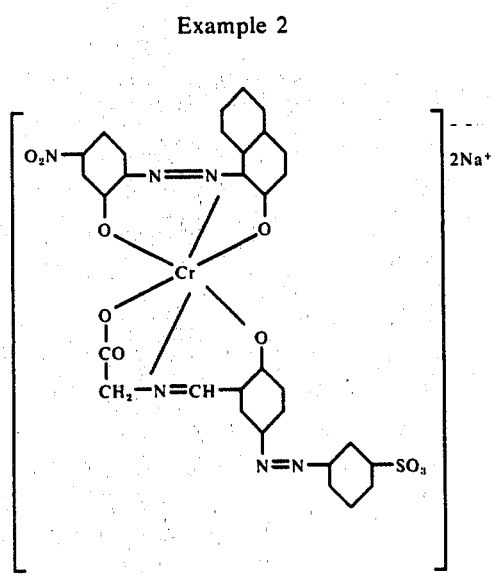

30.9 parts of the monoazo dye obtained from diazotised 5-nitro-2-amino-1-hydroxybenzene and 2-hydroxynaphthalene are suspended in 500 parts by volume of ethylene glycol. Upon addition of 26.65 parts of chromium chloride hexahydrate the mixture is stirred at 120°–125° C until the starting compound can no longer be detected. The solution of the 1:1 chromium complex dye is then treated with 7.5 parts of glycine, 30.6 parts of the coupling product of diazotised 1-aminobenzene-3-sulphonic acid and salicylaldehyde, and 80 parts by volume of 20% sodium carbonate solution, and the batch is stirred for a further 30 to 45 minutes at 80°–85° C to bring the addition reaction to completion. When the reaction is complete, the chromium-containing dye is precipitated by adding saturated sodium chloride solution, collected by filtration, and dried. The product is a dark powder which dissolves in water to give an olive coloured solution and dyes wool or polyamide material from a weakly acid bath in olive shades of good general fastness properties.

Example 3

43.8 parts of the 1:1 complex chromium compound corresponding to 5.2 parts of chromium and 38.8 parts of the monoazo dye obtained from diazotised 5-nitro-2-aminophenol and 2-aminonaphthalene-6-sulphonic acid, 7.5 parts of glycine, 26.05 parts of the coupling product of diazotised 2-chloroaniline and salicylaldehyde, 80 parts by volume of a 20% sodium carbonate solution and 150 parts by volume of ethylene glycol monomethyl ether, are stirred together at 80°–85° C in 500 parts by volume of water until the starting products can no longer be detected. The chromuim-containing dye is precipitated from the reaction solution by adding sodium chloride, isolated by filtration, and dried. After it has been ground, the dye is in the form of a dark powder which dissolves readily in water to give a green solution and with which it is possible to dye wool or polyamide material from a weakly acid bath in full, bright, yellowish green shades of good general fastness properties.

Example 4

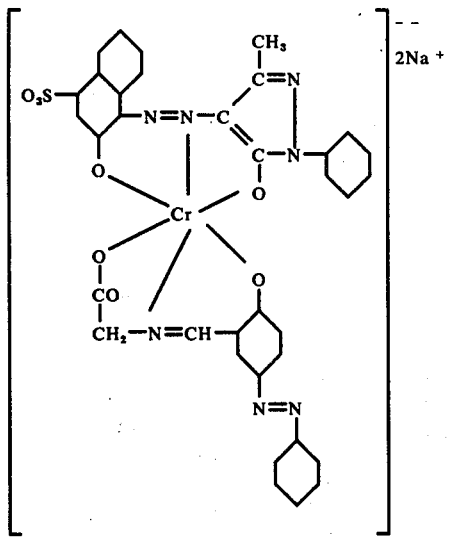

42.4 parts of the monoazo dye of diazotised 1-amino-2-hydroxynaphthalene-4-sulphonic acid and 1-phenyl-3-methyl-5-pyrazolone and 26.65 parts of chromium chloride hexahydrate are stirred together in 500 parts by volume of ethylene glycol at 120°–125° C until the starting compound can no longer be detected. To the solution of the 1:1 chromium complex dye are then added 7.5 parts of glycine, 22.6 parts of the coupling product of diazotised aniline and salicylaldehyde and 80 parts volume of 20% sodium carbonate solution, and the batch is stirred for a further 30 to 45 minutes at 80° to 85° C in order to bring the addition reaction to completion. When the reaction is complete, the chromium-containing dye is precipitated by adding saturated sodium chloride solution, collected by filtration, and dried. The product is a brown powder which dissolves in water to give a red solution and dyes wool and polyamide material in red shades of good general fastness properties.

Example 5

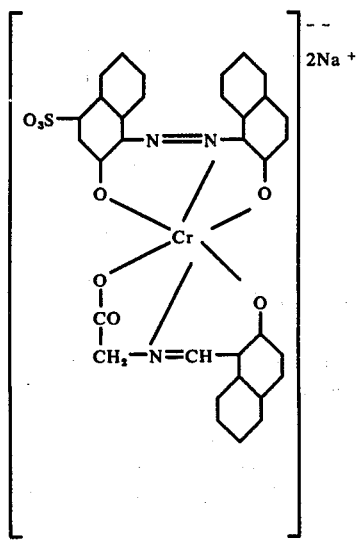

44.4 parts of the 1:1 complex chromium compound corresponding to 5.2 parts of chromium and 39.4 parts of the monoazo dye obtained from diazotised 1-amino-2-hydroxynaphthalene-4-sulphonic acid and 2-hydroxynaphthalene, 17.2 parts of 2-hydroxy-1-naphthaldehyde, 7.5 parts of glycine, and 18 parts of sodium carbonate in the form of a 20% aqueous solution, are suspended in 500 parts of ethylene glycol. The mixture is heated to 80°–85° C and kept at this temperature until the starting materials can no longer be detected. The chromium-containing dye is precipitated by adding saturated sodium chloride solution, collected by filtration, and dried. After it has been dried, the product is a dark powder which dissolved in water to give a greyish-blue solution and dyes wool or polyamide in greyish-blue shades of good fastness properties.

Example 6

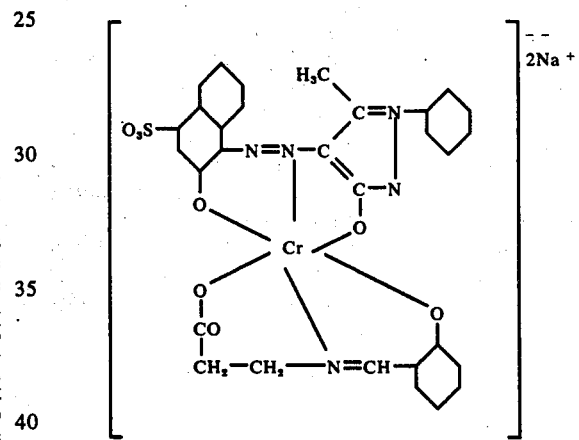

47.4 parts of the 1:1 complex chromium compound corresponding to 5.2 parts of chromium and 42.4 parts of the monoazo dye obtained from diazotised 1-amino-2-hydroxynaphthalene-4-sulphonic acid and 1-phenyl-3-methyl-5-pyrazolone are suspended with 8.9 parts of β-aniline and 12.2 parts of salicylaldehyde in 500 parts of water. The mixture is heated to 80°–85° C and the pH of the suspension is simultaneously increased to 8–8.5 by adding 20% sodium carbonate solution. This temperature is maintained and the pH kept constant (by further addition of 20% sodium carbonate solution) until the addition reaction is complete. The chromium-containing dye is precipitated by adding sodium chloride, collected by filtration, and dried. After it has been dried, the product is a dark powder which dyes polyamide material from a weakly acid bath in fast, red shades. Further chromium complexes are obtained in analogous manner from the azo dyes, amino acids and aldehydes listed in the following table. They dye wool or polyamide material in the shades indicated in the final column of the table.

| No. | Azo dye | azomethine from: | | Shade |
|---|---|---|---|---|
| 1. | [structure: 2,2'-dihydroxy-5-nitro-azobenzene coupled to naphthol - OH groups ortho to N=N, NO₂ para on left ring, right ring is naphthol] | COOH<br>\|<br>CH₂—CH₂—NH₂ | [structure: OH-substituted benzaldehyde (OHC, OH) linked via N=N to benzene with SO₃H] | olive |
| 2. | " | COOH<br>\|<br>(CH₂)₃—NH₂ | " | olive |
| 3. | " | COOH<br>\|<br>(CH₂)₄—NH₂ | " | olive |
| 4. | " | COOH<br>\|<br>(CH₂)₅—NH₂ | " | olive |
| 5. | " | COOH<br>\|<br>CH₂—NH₂ | [structure: OHC, OH on benzene linked via N=N to benzene with SO₃H ortho] | olive |
| 6. | " | COOH<br>\|<br>(CH₂)₂—NH₂ | " | olive |
| 7. | " | COOH<br>\|<br>(CH₂)₃—NH₂ | " | olive |
| 8. | " | COOH<br>\|<br>(CH₂)₄—NH₂ | " | olive |
| 9. | " | COOH<br>\|<br>(CH₂)₅—NH₂ | " | olive |
| 10. | " | COOH<br>\|<br>CH—NH₂<br>\|<br>CH₂—CH<br>    \|<br>    CH₃ | " | olive |
| 11. | " | COOH<br>\|<br>CH—NH₂<br>\|<br>CH₂OH | " | olive |
| 12. | [structure: 2,2'-dihydroxy-5-nitro-azobenzene with naphthol, same as #1] | COOH<br>\|<br>CH—NH₂<br>\|<br>CH₂—SO₃H | [structure: OHC, OH on benzene ring] | olive |
| 13. | [structure: 2,2'-dihydroxy-azo compound with NO₂ and naphthol side] | COOH<br>\|<br>CH₂—NH₂ | [structure: OHC, OH on benzene linked via N=N to benzene with SO₃H] | brown |
| 14. | " | COOH<br>\|<br>CH—NH₂<br>\|<br>CH—CH₃<br>\|<br>CH₃ | " | brown |

-continued

| No. | Azo dye | azomethine from: | | Shade |
|---|---|---|---|---|
| 15. | " | COOH\|(CH$_2$)$_2$—NH$_2$ | " | brown |
| 16. | " | COOH\|(CH$_2$)$_3$—NH$_2$ | " | brown |
| 17. | " | COOH\|(CH$_2$)$_4$—NH$_2$ | " | brown |
| 18 | " | COOH\|(CH$_2$)$_5$—NH$_2$ | " | brown |
| 19. | " | COOH\|CH—NH$_2$\|CH$_2$—SO$_3$H | " | brown |
| 20. | " | COOH\|CH—NH$_2$\|cyclohexyl | " | brown |
| 21. | [structure: HO-naphthyl-N=N-naphthyl-OH with NO$_2$] | " | " | olive |
| 22. | [structure: same as 21 with HO$_3$S substituent] | " | " | olive |
| 23. | [structure: same as 22] | COOH\|CH—NH$_2$\|CH$_2$-cyclohexyl | [structure: OH-naphthyl-CHO] | bluish grey |
| 24. | [structure: same as 22 with NO$_2$] | COOH\|CH$_2$—NH$_2$ | " | grey |
| 25. | " | COOH\|(CH$_2$)$_3$—NH$_2$ | " | grey |
| 26. | [structure: pyrazolone azo dye with cyclohexyl-N, HO$_3$S, OH, CH$_3$] | " | " | red |
| 27. | " | COOH\|CH$_2$—NH$_2$ | " | red |
| 28. | " | COOH\|(CH$_2$)$_3$—NH$_2$ | " | red |

-continued
| No. | Azo dye | azomethine from: | | Shade |
|---|---|---|---|---|
| 29. | " | COOH<br>CH₂—NH₂ | OH<br>OHC— (cyclohexane) | red |
| 30. | 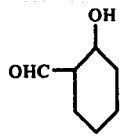 | " | " | bluish-grey |
| 31. | 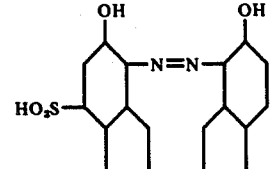 | " | " | grey |
| 32. | 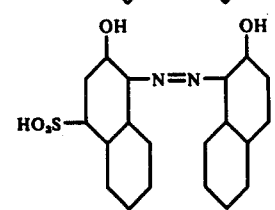 | " | " | corinth |
| 33. | 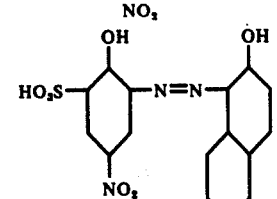 | " | " | brown |
| 34. | 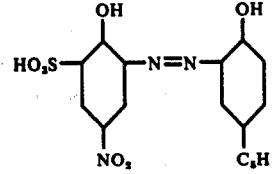 | COOH<br>CH₂—NH₂ | OH<br>OHC— (cyclohexane) | red |
| 35. | " | COOH<br>CH₂—CH₂—NH₂ | " | red |
| 36. | " | COOH<br>CH₂—NH₂ | 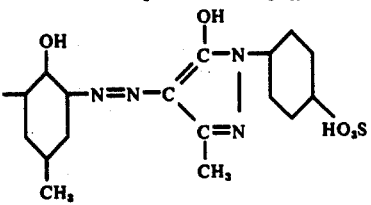 | red |
| 37. | " | COOH<br>CH₂—CH₂—NH₂ | " | red |
| 38. | " | COOH<br>CH₂—NH₂ | 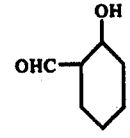 | red |
| 39. | " | COOH<br>CH₂—CH₂—NH₂ | " | red |

-continued

| No. | Azo dye | azomethine from: | | Shade |
|---|---|---|---|---|
| 40. | " | COOH<br>\|<br>CH₂—NH₂ | OH<br>\|<br>OHC—⌬—N=N—⌬—Cl | red |
| 41. | " | COOH<br>\|<br>CH₂—CH₂—NH₂ | " | red |
| 42. | " | COOH<br>\|<br>CH₂—NH₂ | OH<br>\|<br>OHC—⌬—N=N—⌬—Cl | red |
| 43. | " | COOH<br>\|<br>CH₂CH₂—NH₂ | " | red |
| 44. | " | COOH<br>\|<br>CH₂—NH₂ | OH<br>\|<br>OHC—⌬—N=N—⌬—SO₃H | red |
| 45. | " | COOH<br>\|<br>CH₂—NH₂ | OH<br>\|<br>OHC—⌬—N=N—(naphthyl) | red |
| 46 | " | COOH<br>\|<br>CH₂CH₂—NH₂ | " | red |
| 47. | " | COOH<br>\|<br>CH—NH₂<br>\|<br>CH<br>/ \<br>CH₃ CH₃ | " | red |
| 48. | OH   OH<br>HO₃S—⌬—N=N—⌬<br>\|       \|<br>NO₂    C₅H₁₁ | COOH<br>\|<br>CH₂—CH₂—NH₂ | OH<br>\|<br>OHC—⌬ | brown |
| 49. | OH   H₂N<br>⌬—N=N—(naphthyl-SO₃H)<br>\|<br>NO₂ | COOH<br>\|<br>CH₂—NH₂ | OH<br>\|<br>OHC—⌬ | green |

-continued

| No. | Azo dye | azomethine from: | | Shade |
|---|---|---|---|---|
| 50. | (structure: OH, H₂N, NO₂ groups on naphthalene with N=N) | " | " | green |
| 51. | (structure: OH, H₂N, NO₂, SO₃H on naphthalene with N=N) | COOH–CH₂CH₂–NH₂ | " | green |
| 52. | " | COOH–CH₂CH₂CH₂–NH₂ | " | green |
| 53. | " | COOH–CH₂CH₂CH₂–CH₂–NH₂ | " | green |
| 54. | " | COOH–CH(–NH₂)–cyclohexyl | " | green |
| 55. | " | COOH–CH₂–NH₂ | (structure: OH, OHC, N=N–cyclohexyl) | green |
| 56. | " | COOH–CH₂CH₂–NH₂ | " | green |
| 57. | (structure: OH, H₂N, NO₂, SO₃H on naphthalene with N=N) | COOH–CH(–NH₂)–cyclohexyl | (structure: OH, OHC, N=N–cyclohexyl) | green |
| 58. | " | COOH–CH₂–NH₂ | (structure: OH, OHC, N=N–cyclohexyl–N=N–cyclohexyl) | olive |
| 59. | " | COOH–CH(CH₂CH₂NH₂) | | olive |

-continued

| No. | Azo dye | azomethine from: | | Shade |
|---|---|---|---|---|
| 60. | " | COOH, CH-NH₂, cyclohexyl | " | olive |
| 61. | " | COOH, CH₂-NH₂ | OH, OHC-, decalin | olive-green |
| 62. | " | COOH, CH₂CH₂-NH₂ | " | olive-green |
| 63. | " | COOH, CH-NH₂, cyclohexyl | " | olive |
| 64. | OH, NO₂-phenyl-N=N-, H₂N-naphthyl-SO₃H | COOH, CH₂-NH₂ | OH, OHC-, -N=N-, -SO₃H | green |
| 65. | " | COOH, CH₂CH₂-NH₂ | " | green |
| 66. | " | COOH, CH-NH₂, cyclohexyl | " | green |
| 67. | OH, NO₂-phenyl-N=N-, H₂N-naphthyl | COOH, CH₂-NH₂ | " | green |
| 68. | " | COOH, CH₂CH₂-NH₂ | " | green |
| 69. | " | COOH, CH-NH₂, cyclohexyl | " | green |
| 70. | OH, NO₂-phenyl-N=N-, NH₂-naphthyl-SO₃H | COOH, CH₂-NH₂ | " | green |

| No. | Azo dye | azomethine from: | | Shade |
|---|---|---|---|---|
| 71. | 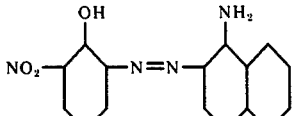 | " | " | dark green |
| 72. | 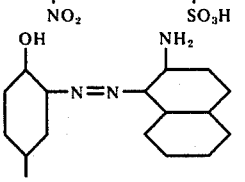 | " | " | olive |
| 73. | 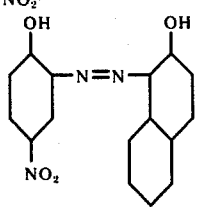 | COOH<br>CH₂—NH₂ |  | brown |
| 74. | 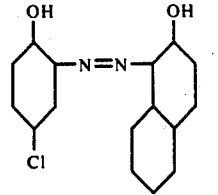 | " | " | brown |
| 75. | 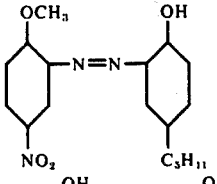 | " | " | brown |
| 76. | 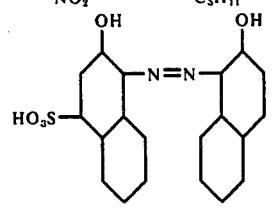 | " | " | brown |
| 77. | 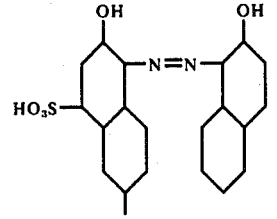 | " | " | brown |
| 78. | 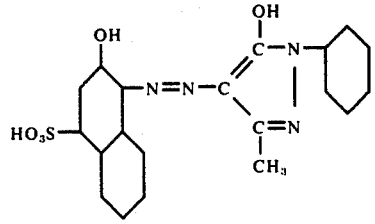 | " | " | orange brown |

-continued

| No. | Azo dye | azomethine from: | | Shade |
|---|---|---|---|---|
| 79. | (structure: phenyl with OH, HO₃S, NO₂ azo-linked to phenyl with OH, C₅H₁₁) | " | " | brown |
| 80. | (structure: phenyl with OH, HO₃S, NO₂ azo-linked to naphthyl with OH) | " | " | brown |
| 81. | (structure: naphthyl with OH, HO₃S, NO₂ azo-linked to naphthyl with OH) | COOH–CH₂–NH₂ | (structure: OHC, OH-phenyl azo-linked to phenyl-N=N ring) | brown |
| 82. | " | COOH–CH₂CH₂–NH₂ | " | brown |
| 83. | (structure: naphthyl with OH, HO₃S azo-linked to naphthyl with OH) | COOH–CH₂–CH₂–NH₂ | " | brown |
| 84. | (structure: phenyl with OH, NO₂ azo-linked to naphthyl with OH) | COOH–CH₂–NH₂ | " | brown |
| 85. | " | COOH–CH₂–CH₂–NH₂ | " | brown |
| 86. | " | COOH–CH₂–NH₂ | (structure: OHC, OH-phenyl azo-linked to naphthyl with HO₃S, N=N) | brown |
| 87. | " | COOH–CH₂CH₂–NH₂ | " | brown |

-continued
| No. | Azo dye | azomethine from: | | Shade |
|---|---|---|---|---|
| 88. | " | 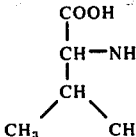 | 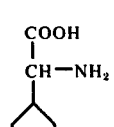 | olive |
| 89. | " | 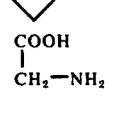 | " | olive |
| 90. | " | 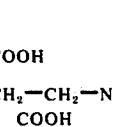 | 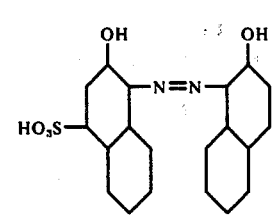 | brown |
| 91. | " | 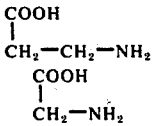 | " | brown |
| 92. | 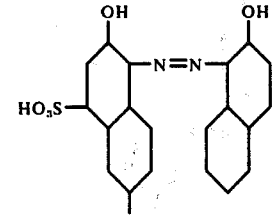 |  | 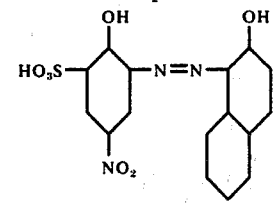 | olive |
| 93. |  | " | " | olive brown |
| 94. | 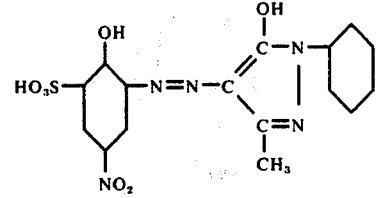 | " | " | brown |
| 95. |  | " | " | orange |

-continued

| No. | Azo dye | azomethine from: | | Shade |
|---|---|---|---|---|
| 96. | (structure: 2-hydroxy-3-sulfo-5-nitrophenylazo acetoacetic acid cyclohexylamide) | " | " | yellow |
| 97. | (structure: 2-carboxy-4-sulfophenylazo acetoacetic acid cyclohexylamide azomethine) | " | " | yellow |
| 98. | (structure: 2-carboxyphenylazo acetoacetic acid (sulfocyclohexyl)amide azomethine) | " | " | yellow |
| 99. | (structure: 2-hydroxy-3-sulfo-5-nitrophenylazo acetoacetic acid cyclohexylamide azomethine) | " | phenyl-CH(OH)-CHO | orange |
| 100. | (structure: 2-hydroxy-6-sulfo-naphthylazo acetoacetic acid cyclohexylamide azomethine) | HOOC-CH(NH$_2$)-cyclohexyl | 2-hydroxy-naphthyl-CHO | red |
| 101. | (structure: 2-hydroxy-4-nitrophenylazo-2-hydroxy-naphthyl) | HOOC-CH(NH$_2$)-CH$_2$-cyclohexyl | OHC-phenyl(OH)-N=N-phenyl-SO$_3$H | olive |
| 102. | (structure: 2-hydroxy-4-sulfo-naphthylazo-2-hydroxy-naphthyl) | HOOC-CH$_2$-CH$_2$-NH$_2$ | OHC-phenyl(OH)-N=N-phenyl-N=N-phenyl-SO$_3$H | brown |

-continued

| No. | Azo dye | azomethine from: | | Shade |
|---|---|---|---|---|
| 103. | (structure: naphthalene with OH, HO₃S, NO₂, N=N to naphthol-OH) | " | " | brown |
| 104. | (structure: naphthalene with OH, HO₃S, NO₂, N=N to naphthol-OH) | " | " | brown |
| 105. | (structure: naphthalene with OH, HO₃S, N=N to pyrazolone with cyclohexyl-N, CH₃) | " | " | reddish-brown |
| 106. | " | COOH<br>CH₂—NH₂ | (structure: OHC, OH, N=N, OCH₃) | reddish-brown |
| 107. | " | " | (structure: OHC, OH, N=N, N=N, cyclohexyl) | reddish-brown |
| 108. | (structure: naphthalene with OH, HO₃S, NO₂, N=N to naphthol-OH) | " | " | brown |
| 109. | (structure: OH, HO₃S, NO₂, N=N to pyrazolone with OH, N-cyclohexyl, CH₃) | " | " | orange |

| No. | Azo dye | azomethine from: | | Shade |
|---|---|---|---|---|
| 110. | (structure: naphthol-SO₃H–OH with N=N to pyrazolone bearing N-cyclohexyl, OH, CH₃, C=N) | COOH, CH-NH₂, cyclohexyl | OH, OHC, cyclohexyl | red |
| 111. | (structure: HO₃S-naphthol-OH with N=N to naphthol-OH) | " | " | greyish-blue |
| 112. | (structure: naphthol-SO₃H–OH with N=N to pyrazolone bearing N-cyclohexyl, OH, CH₃, C=N) | COOH, CH₂–NH₂ | OH, OHC-cyclohexyl-N=N-cyclohexyl-Cl | red |
| 113. | " | COOH, CH₂–CH₂–NH₂ | OH, OHC-cyclohexyl-N=N-cyclohexyl(Cl, Cl) | red |
| 114. | " | COOH, CH₂–NH₂ | OH, OHC-cyclohexyl-N=N-cyclohexyl-Cl | red |
| 115. | (structure: O₂N, OH, CH₃-cyclohexyl with N=N to pyrazolone bearing N-cyclohexyl-SO₃H, OH, CH₃, C=N) | COOH, (CH₂)₁₀–NH₂ | OH, OHC, cyclohexyl | red |
| 116. | " | COOH, CH₂–NH₂ | OH, OHC-cyclohexyl-N=N-cyclohexyl-OCH₃ | red |

-continued

| No. | Azo dye | azomethine from: | | Shade |
|---|---|---|---|---|
| 117 | (azo dye structure with OH, N=N, SO₃H groups) | COOH<br>CH₂—NH₂ | (azomethine structure with OH, OHC, N=N, SO₃H) | brown |
| 118. | '' | COOH<br>CH₂CH₂—NH₂ | '' | brown |
| 119. | (azo dye structure with OH, N=N, SO₃H groups) | COOH<br>CH₂—NH₂ | '' | brown |
| 120. | '' | COOH<br>CH₂CH₂—NH₂ | '' | brown |
| 121. | (azo dye structure with OH, N=N, SO₃H groups) | COOH<br>CH₂—NH₂ | (azomethine structure with OH, OHC, N=N) | brown |
| 122. | '' | COOH<br>CH₂—NH₂ | (azomethine structure with OH, OHC, N=N, S₃H) | brown |
| 123. | (azo dye structure with OH, N=N, SO₃H groups) | COOH<br>CH₂—NH₂ | (azomethine structure with OH, OHC, N=N) | brown |
| 124. | (azo dye structure with OH, N=N, NO₂ groups) | COOH<br>CH₂—NH₂ | (azomethine structure with OH, OHC, N=N, SO₃H) | brown |
| 125. | '' | COOH<br>CH₂CH₂—NH₂ | '' | brown |
| 126. | (azo dye structure with OH, N=N, NO₂, C₅H₁₁ groups) | COOH<br>CH₂—NH₂ | '' | brown |
| 127. | '' | COOH<br>CH₂CH₂—NH₂ | | brown |

-continued

| No. | Azo dye | azomethine from: | | Shade |
|---|---|---|---|---|
| 128. | (structure: HO₃S, OH, NO₂ / N=N / OH, C₅H₁₁) | COOH–CH₂–NH₂ | " | brown |
| 129. | (structure: HO₃S, OH, NO₂ / N=N / OH, C₅H₁₁) | COOH–CH₂CH₂–NH₂ | (structure: OHC, OH / N=N / SO₃H, N=N) | brown |
| 130. | (structure: OCH₃, NO₂ / N=N / OH, cyclohexyl) | COOH–CH₂–NH₂ | " | brown |
| 131. | " | COOH–CH₂CH₂–NH₂ | " | brown |
| 132. | (structure: OH, NO₂ / N=N / NH₂, SO₃H) | COOH–CH₂CH₂–NH₂ | " | olive brown |
| 133. | (structure: OH, HO₃S, NO₂ / N=N / OH) | COOH–CH₂–NH₂ | " | brown |
| 134. | (structure: OH, HO₃S, NO₂ / N=N / OH) | COOH–CH₂CH₂–NH₂ | (structure: OHC, OH / N=N / SO₃H, N=N) | brown |
| 135. | (structure: OH, HO₃S / N=N / OH) | COOH–CH₂–NH₂ | " | brown |
| 136. | " | COOH–CH₂CH₂–NH₂ | " | brown |
| 137. | (structure: OH, HO₃S, NO₂ / N=N / OH) | COOH–CH₂–NH₂ | " | brown |
| 138. | " | COOH–CH₂CH₂–NH₂ | " | brown |
| 139. | " | COOH–CH(NH₂)–CH₃ | " | brown |

-continued

| No. | Azo dye | azomethine from: | | Shade |
|---|---|---|---|---|
| 140. | 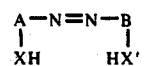 | COOH<br>\|<br>CH$_2$—NH$_2$ | 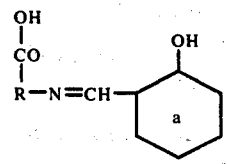 | brown |
| 141. | " | COOH<br>\|<br>CH$_2$CH$_2$—NH$_2$ | 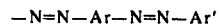 " | brown |

EXAMPLE 7

12.2 parts of 2-hydroxybenzaldehyde and 13.1 parts of 8-amino-n-capronic acid are dissolved in 150 parts of ethylene glycol monoethyl ether. The reaction mixture is heated with stirring to 125° C and kept at this temperature until the azomethine condensation is complete. After cooling to 80° C, 26.5 parts of chromium-(III) chloride hexahydrate are added and thereafter stirring is continued for 6 hours at 125° C. A clear, greenishyellow solution of the 1:1 chromium complex is obtained.

After cooling to 90° C, a solution of 38.8 parts of the monoazo dye obtained from diazotised 5-nitro-2-aminophenol and 2-aminonaphthalene-5-sulphonic acid in 1500 parts of water and 4 parts of sodium hydroxide is added. After adjusting the pH to 8.5 to 9.5 by the dropwise addition of dilute sodium hydroxide solution, the reaction mixture is stirred at 90°-95° C, whereupon the two starting dyes react to form the homogeneous mixed complex. This product is precipitated by adding sodium chloride, isolated by filtration, dried in vacuo, and ground, to yield a dye which corresponds to the homogeneous mixed complex of No. 53 of the table.

Dyeing Procedure for Wool 100 parts of wool hand-knitting yarn are put at 50° C into a dyebath which contains 2 parts of the dye No. 42 of the table, 4 parts of ammonium sulphate and 2 parts of a levelling agent, in 4000 parts of water. The liquor is brought to the boil over the course of 45 minutes and kept thereat for a further 45 minutes. The red dyed yarn is then removed from the bath, thoroughly rinsed with cold water and dried.

Dyeing Procedure for Leather 100 parts of clothing velours leather (dry weight) are wet back at 50° C for 2 hours in a solution of 1000 parts of water and 2 parts of 24% ammonia and subsequently dyed for 1 hour at 60° C in a solution of 1000 parts of water, 2 parts of 24% ammonia and 6 parts of the dye of Example 1. A solution of 40 parts of water and 4 parts of formic acid (85%) is then added and dyeing is continued for a further 30 minutes. The leather is then thoroughly rinsed and, if appropriate, treated for 30 minutes at 50° C with 2 parts of a dicyandiamine/formaldehyde condensation product. Other kinds of velour leather as well as glove leather can be dyed in the same manner.

Dyeing Procedure for Polyamide 100 parts of texturised polyamide fabric (nylon 66) are put at 40°-50° C into a dyebath which contains 2 parts of the dye of Example 3 and 3 parts of ammonium sulphate in 4000 parts of water. The dyebath is heated to the boil in the course of 45 minutes and kept at this temperature for a further 60 minutes. After cooling to 80° C, the polyamide fabric is removed from the bath, then rinsed and dried. It is dyed in a bright, yellowish-green shade.

We claim:

1. A 1:2 chromium complex dye containing one molecule of a non-heterocyclic azo compound of the formula $$\begin{array}{c} A-N=N-B \\ | \quad\quad\quad | \\ XH \quad\quad HX' \end{array}$$

and one molecule of a non-heterocyclic azomethine compound of the formula $$\begin{array}{c} OH \\ | \\ CO \\ | \\ R-N=CH-\underset{a}{\bigcirc}-OH \end{array}$$

complexed to a chromium atom, wherein
A is an ortho-phenylene or -naphthylene diazo component radical;
B is an ortho-phenylene or -naphthylene coupling component radical;
X is —O— or —CO—O—;
X' is —O—, —NH—, —N(lower alkyl)—, —N-(aralkyl)— or —N(aryl)—;
R is a substituted or unsubstituted aliphatic radical; the benzene ring a is unsubstituted or substituted by a fused benzene ring, halo, nitro, alkyl or alkoxy, and wherein said compounds contain together 0 to 5 water-solubilizing groups, 0 to 1 group of the formula —N=N—Ar—N=N—Ar' and 0 to 2 groups of the formula —N=N—Ar" wherein

Ar, Ar' and Ar" each represent an aromatic or carbocyclic radical.

2. A 1:2 chromium complex dye according to claim 1 containing one molecule of a compound of the formula

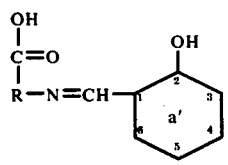

and one molecule of a compound of the formula

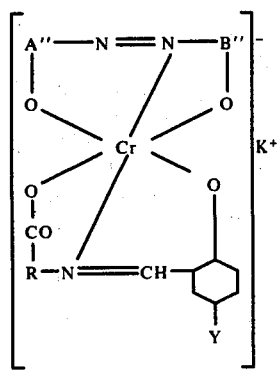

complexed to a chromium atom wherein
X" is —O— or —NH—; and wherein
the benzene ring $a'$ is substituted in the 3-position or the 5-position a group of the formula

or

or is unsubstituted.

3. A chromium complex dye according to claim 2, which is substituted by a group of the formula —N=N—Ar—N=N—Ar'.

4. A chromium complex dye according to claim 1, which is substituted by a group of the formula —N=N—Ar—N=N—Ar'.

5. Chromium complex dyes according to claim 1, wherein R is a substituted or unsubstituted alkylene or alkenylene group.

6. Chromium complex dyes according to claim 1, wherein R represents an alkylene group of 1 to 11 carbon atoms which is unsubstituted or substituted by hydroxyl, amino, methylmercapto, methylsulphonyl, sulpho, phenyl or hydroxyphenyl.

7. Chromium complex dyes according to claim 1, wherein the radical R is an α-amino acid or a β-amino acid.

8. Chromium complex dyes according to claim 1, wherein X is an oxygen atom.

9. Chromium complex dyes according to claim 1, which contain at least one sulpho group preferably 1 to 3 sulpho groups.

10. Chromium complex dyes according to claim 1, of the formula

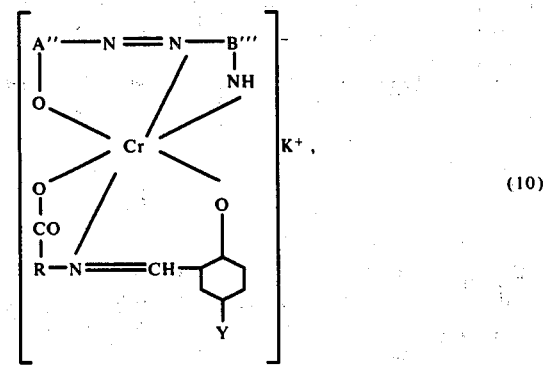

(9)

wherein
A' represents a phenyl or naphthyl radical which is unsubstituted or substituted by sulpho, chlorine, bromine, nitro, cyano, low molecular alkyl and low molecular alkoxy,
B" represents a phenyl radical which is unsubstituted or substituted by alkyl or acylamino, or is a naphthyl radical which is unsubstituted or substituted by chlorine, sulpho or acylamino,
R represents a methylene or ethylene group which is unsubstituted or substituted by alkyl of 1 to 4 carbon atoms, phenyl, hydroxyphenyl or benzyl,
$K^+$ represents a cation and
Y represents hydrogen or a radical of the formula $$-N=N-(Ar_1-N=N)_n Ar_2 \qquad (11)$$

wherein $n$ is 0 or 1,
$Ar_1$ represents a phenylene or naphthylene radical which is unsubstituted or substituted by sulpho, alkyl or alkoxy, and
$Ar_2$ represents a phenyl or naphthyl radical which is unsubsubstituted or substituted by sulpho, chlorine, bromine, nitro, alkyl or alkoxy groups.

11. A chromium complex dye according to claim 10 wherein $n$ is 1.

12. Chromium complex dyes according to claim 1 of the formula (10)

wherein A" and Y are as defined in claim 8, $K^+$ is a cation, and R is as defined in claim 8, and B''' represents a naphthyl radical which is unsubstituted or substituted by a sulpho group.

13. Chromium complex dyes according to claim 12, wherein A" represents a phenyl or naphthyl radical which is substituted by nitro or sulpho.

14. Chromium complex dyes according to claim 12, wherein B" is the radical of α-naphthol or β-naphthol.

15. Chromium complex dyes according to claim 12, wherein R is a methylene, ethylidene or ethylene group.

16. Chromium complex dyes according to claim 1 of the formula

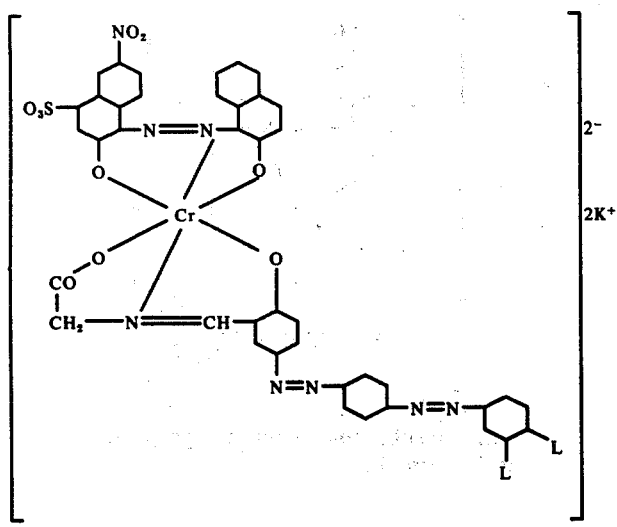
wherein each symbol L represents hydrogen or one L represents hydrogen and the other one the SO₃K-group.
17. Chromium complex dyes according to claim 1 of the formula
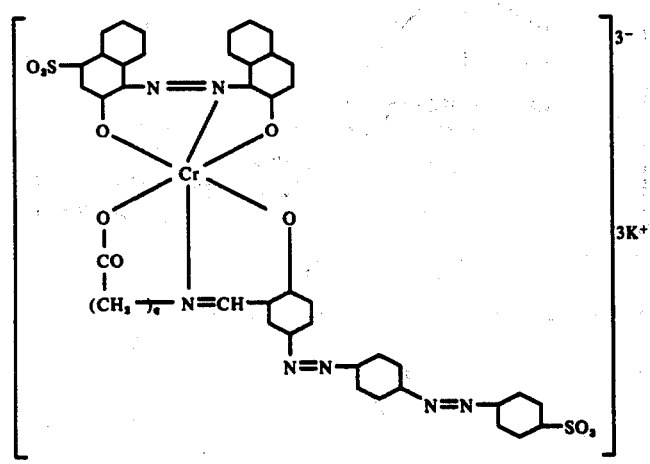
wherein $q$ is 1 or 2.
18. The chromium complex dye according to claim 1 of the formula
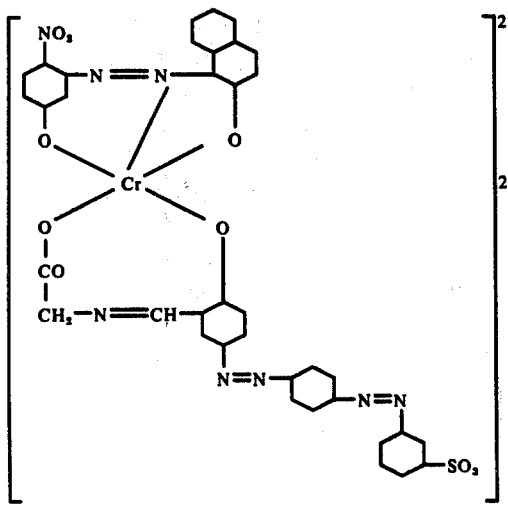
19. The chromium complex dye according to claim 1 of the formula
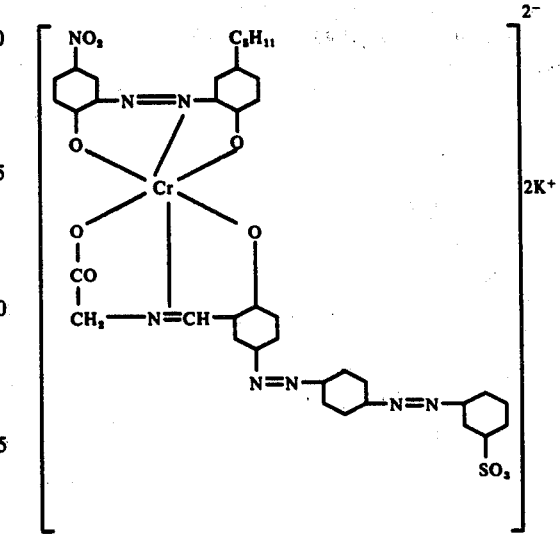

20. The chromium complex dye according to claim 1 of the formula
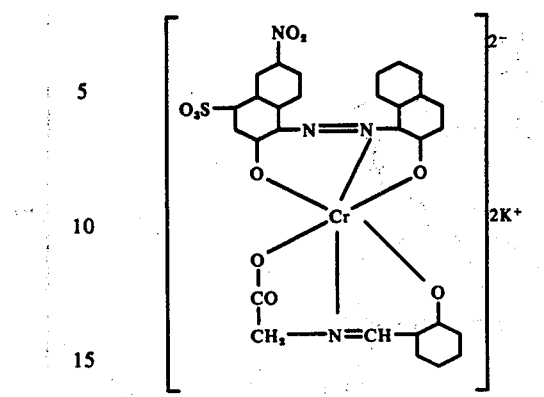
21. The chromium complex dye according to claim 1 of the formula
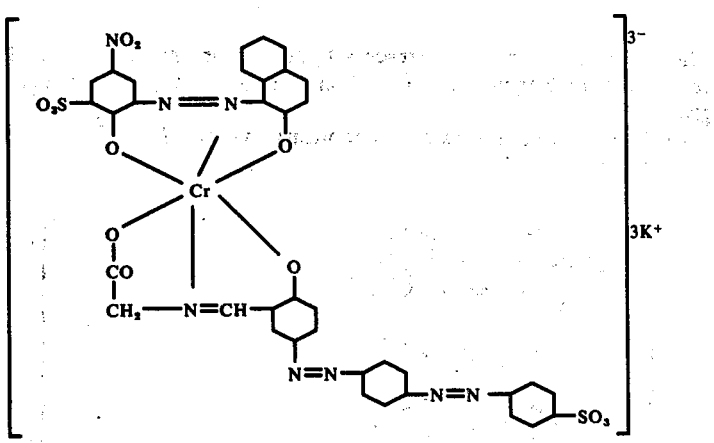
* * * * *

UNITED STATES PATENT OFFICE
CERTIFICATE OF CORRECTION

Patent No. 4,033,942     Dated    July 5, 1977

Inventor(s)  FABIO BEFFA ET AL.

It is certified that error appears in the above-identified patent and that said Letters Patent are hereby corrected as shown below:

Col. 44 - Line 33 - Claim 12, delete "1" and insert -- 8 --.

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*